United States Patent
Ma et al.

(10) Patent No.: US 11,635,538 B2
(45) Date of Patent: Apr. 25, 2023

(54) EQUIVALENT LINEAR VELOCITY FOR FIRST ARRIVAL PICKING OF SEISMIC REFRACTION

(71) Applicant: Saudi Arabian Oil Company, Dhahran (SA)

(72) Inventors: Yue Ma, Beijing (CN); Tong Wang Fei, Dhahran (SA); Yi Luo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 580 days.

(21) Appl. No.: 16/384,438

(22) Filed: Apr. 15, 2019

(65) Prior Publication Data
US 2020/0326440 A1    Oct. 15, 2020

(51) Int. Cl.
G01V 1/30    (2006.01)

(52) U.S. Cl.
CPC ................................. *G01V 1/305* (2013.01)

(58) Field of Classification Search
CPC .... G01V 1/305; G01V 1/288; G01V 2210/52; G01V 2210/6222; G01V 2210/512; G01V 2210/41; G01V 2210/671; G01V 1/303
See application file for complete search history.

(56) References Cited

U.S. PATENT DOCUMENTS

| | | | |
|---|---|---|---|
| 5,771,170 | A | 6/1998 | Withers et al. |
| 6,424,920 | B1 | 7/2002 | Osypov |
| 8,472,674 | B2 | 6/2013 | Yevskyy et al. |
| 11,435,491 | B2 | 9/2022 | Ali et al. |
| 2005/0128872 | A1 | 6/2005 | Valero et al. |
| 2010/0042325 | A1 | 2/2010 | Beasley et al. |
| 2010/0074053 | A1 | 3/2010 | Jaiswal et al. |
| 2011/0082647 | A1 | 4/2011 | Edme et al. |
| 2012/0051177 | A1 | 3/2012 | Hardage |

(Continued)

FOREIGN PATENT DOCUMENTS

WO    2017040399    3/2017

OTHER PUBLICATIONS

Boschetti et al., "A fractal-based algorithm for detecting first arrivals on seismic traces," Geophysics vol. 61, Jul.-Aug. 1996, 8 pages.

(Continued)

*Primary Examiner* — Robert G Bachner
(74) *Attorney, Agent, or Firm* — Fish & Richardson P.C.

(57) ABSTRACT

Methods and systems including computer programs encoded on a computer storage medium, for utilizing equivalent linear velocity for first arrival picking of seismic refraction. In one aspect, a method includes receiving data for the shot gather record, generating a diving wave equation curve for a particular parameter pair of multiple parameter pairs, and integrating the shot gather record data corresponding to the diving wave equation curve over a selected range of offsets of the shot gather to generate an equivalent linear velocity value for the particular parameter pair and the shot gather record data, selecting, from the equivalent linear velocity values for the plurality of parameter pairs, a greatest equivalent linear velocity value of the equivalent linear velocity values, the greatest equivalent linear velocity value corresponding to a first-arrival parameter pair, and determining, using the first-arrival parameter pair, a set of first-arrival onsets for the selected sub-range of offsets.

18 Claims, 7 Drawing Sheets

(56) References Cited

U.S. PATENT DOCUMENTS

| | | |
|---|---|---|
| 2012/0113750 A1 | 5/2012 | Al-Momin et al. |
| 2014/0219054 A1 | 8/2014 | Mousa et al. |
| 2016/0209534 A1 | 7/2016 | Behura |
| 2017/0176617 A1 | 6/2017 | Colombo et al. |
| 2018/0059277 A1 | 3/2018 | Bloor et al. |

OTHER PUBLICATIONS

Coppens, "First arrivals picking on common-offset trace collections for automatic estimation of static corrections," presented at the 45th meeting of the European Association of Exploration Geophysicists, Jun. 1983, Geophysical Prospecting, vol. 33, Dec. 1985, 20 pages.

Murat and Rudman, "Automated first arrival picking: A neural network approach," Geophysical Prospecting, vol. 40, Aug. 1992, 18 pages.

Peraldi and Clement, "Digital processing of refraction data: Study of first arrivals," presented at the 33rd Meeting of the European Association of Exploration Geophysicists, Jun. 1971, Geophysical Prospecting, vol. 20, Sep. 1972, 20 pages.

Sabbione and Velis, "Automatic first-breaks picking: New strategies and algorithms," Geophysics vol. 75, No. 4, Jul.-Aug. 2010, 10 pages.

Stovas and Alkhalifah, "Analytical approximations of diving-wave imaging in constant-gradient medium," Geophysics Prospecting, vol. 79, No. 4, Jul.-Aug. 2014, 10 pages.

GCC Examination Report in GCC Appln. No. GC 2020-39542, dated Aug. 15, 2021, 5 pages.

Keho et al., "Revisiting automatic first arrival picking for large 3D land surveys," 79th Society of Exploration Geophysicists International Exposition and Annual Meeting, Houston, Texas, Oct. 25-30, 2009, 5 pages.

PCT International Search Report and Written Opinion in International Appln. No. PCT/US2020/028066, dated Aug. 7, 2020, 16 pages.

Chen et al., "Paper automated time-domain transform of converted waves by prestack double-parameter scanning," Journal of Geophysics Publishing, Jul. 2013, 10(4): 1-11.

Chen et al., "PS-wave anisotropic migration velocity analysis based on simplified moveout equation," International Geophysical Conference, Apr. 17-20, 2017, Qingdao, China, pp. 456-459.

Dai et al., "A revised two-parameter moveout equation of PS converted waves in VTI media," SEG Technical Program Expanded Abstracts, Jan. 2010, pp. 248-252.

Liu et al., "CFP based shear wave velocity model building using converted waves," SEG Technical Program Expanded Abstracts, Apr. 2019, 15:2679-2683.

Lu et al., "Joint velocity updating for anisotropic PP and PS prestack time migration based on hyperbolic correction of nonhyperbolic moveout," Journal of Geophysics and Engineers, Institute of Physics Publishing, Apr. 2018, 15(4): 1171-1186.

PCT International Search Report and Written Opinion in International Appln. No. PCT/US2020/028069, dated Jul. 22, 2020, 16 pages.

Kumar, "Parameter inversion for seismic anisotropy," The University of Texas at Austin, Dissertation for Degree of Doctor of Philosophy, Dec. 2006, 146 pages.

EQUIVALENT LINEAR VELOCITY FOR FIRST ARRIVAL PICKING OF SEISMIC REFRACTION

TECHNICAL FIELD

This disclosure relates to seismic data processing.

BACKGROUND

First arrival picking plays an important role in seismic data processing. The accurate determination of the first-arrival onsets is needed, for example, for calculating the static corrections to correct for near-surface irregularities. Additionally, applications such as near-surface tomography require precise and rapid automated detection of the first arrivals. The quality of the first arrivals can depend on, for example, the source type, near-surface structures, and signal-to-noise ratio of the shot gather. Conventional methods for first arrival picking, such as manual picking, involves visualization of the amplitudes and waveform changes on the shot gather, and can be time-consuming and reflect subjective biases of a human interpreter. Software utilized to interactively facilitate the picking process where human interpreters use semi-automatic picking software to pick first arrivals on shot gathers, can still be affected by human bias and can be very time consuming for large three-dimensional surveys consisting of hundreds of millions of traces. As the desire for high fold, long offset, wide azimuth, and densely sampled surveys increases dramatically, fully automatic first-arrival picking methods become more important for rapid picking in a consistent and objective manner.

SUMMARY

This specification describes technologies relating to utilizing an equivalent linear velocity along a depth dimension to compute first-arrival onsets associated with the refracted energy of shot records. For a range of offsets in the shot record data, seismic first arrivals associated with refracted energy can be predicted by a diving-wave moveout equation and by assuming a constant gradient velocity medium. Given a particular shot record including a maximum offset, a number of iterations can be performed, each iteration over a particular sub-range of the range of offsets. The number of iterations performed can be determined in part by practical considerations, for example, cost consideration, available processing power, required accuracy of the first arrival onset picking, noise in the shot record data, or other similar practical considerations. The first arrival onsets are picked using the methods described in this document can be used in velocity model building, for example, initial depth velocity models, and seismic data processing.

In general, one innovative aspect of the subject matter described in this specification can be embodied in methods that include the actions of receiving, by at least one hardware processor, data for a shot gather record for a medium, where a time for receiving the shot gather is a function of offset for a range of offsets, and where the range of offsets includes at least two sub-ranges of offsets. For a particular sub-range of offsets of the range of offsets, and for each parameter pair of multiple parameter pairs, where a particular parameter pair is a velocity of sound in the medium and a gradient variable: generating a diving wave equation curve for the particular parameter pair, and integrate, over the particular sub-range of offsets, the shot gather record data corresponding to the diving wave equation curve to generate an equivalent linear velocity value for the particular parameter pair and the shot gather record data, and selecting a greatest equivalent linear velocity value of the equivalent linear velocity values for the multiple parameter pairs, where the greatest equivalent linear velocity value corresponds to a first-arrival parameter pair, and selecting, using the first-arrival parameter pair, a set of first-arrival onsets is determine for the sub-range of offsets. Other embodiments of this aspect include corresponding systems, apparatus, and computer programs, configured to perform the actions of the methods, encoded on computer storage devices.

These and other embodiments can each optionally include one or more of the following features. In some implementations, integrating the shot gather record data corresponding to the diving wave equation curve includes a summation of the stacked shot gather record data along the diving wave equation curve for the particular parameter pair value.

In some implementations, selecting, from the equivalent linear velocity values, a greatest equivalent linear velocity value includes generating an equivalent linear velocity spectrum from the equivalent linear velocity values corresponding to the multiple parameter pairs, and selecting a greatest magnitude value of the equivalent linear velocity values from the equivalent linear velocity spectrum.

The equivalent linear velocity spectrum and the set of first-arrival onsets can be generated in a first iteration, and then the generation of the equivalent linear velocity and the set of first-arrival onsets can be repeated for multiple iterations until the selected sub-ranges of offsets cover the range of offsets for the shot gather record.

In some implementations, determining a set of first-arrival onsets for the selected sub-range of offsets using the first-arrival parameter pair includes generating a diving wave equation curve using the first-arrival parameter pair. The particular variable parameter pair can be used to generate, for the sub-range of offsets, a constant gradient velocity plot.

Other embodiments of this aspect include corresponding systems, apparatus, and computer programs which may be configured to perform the actions of the methods, where the methods may be encoded on computer storage devices.

Particular embodiments of the subject matter described in this specification can be implemented so as to realize one or more of the following advantages. Rather than picking first arrivals directly, the subject matter of this application picks an equivalent linear velocity along a depth dimension that can be used to generate first-arrival onsets associated with refracted energies of the shot gather. The indirect picking using the equivalent linear velocity can result in improved reliability in first arrival onset picking, especially when the seismic data is contaminated with heavy noise. The subject matter of this application can yield first arrival onset picking in a cost-efficient and rapid manner, which can improve the efficiency of computer processing by reducing a number of calculations required to arrive at the first arrival onset values. Additionally, a number of iterations to perform to find a first arrival onset solution can be selected based in part on a threshold of accuracy, available processing power, cost considerations, or other practical considerations. In some embodiments, as few as two iterations can yield a rough estimate that can be used in other discovery techniques and tools. The picked constant gradient velocity associated with the refracted first-arrivals picked using the methods described in this document can be used in an inversion scheme to derive an accurate near-surface velocity model, and can be applied in subsurface imaging and geological characterization.

The details of one or more embodiments of the subject matter described in this specification are set forth in the accompanying drawings and the description in this document. Other features, aspects, and advantages of the subject matter will become apparent from the description, the drawings, and the claims.

DETAILED DESCRIPTION

Overview

Figure 1:
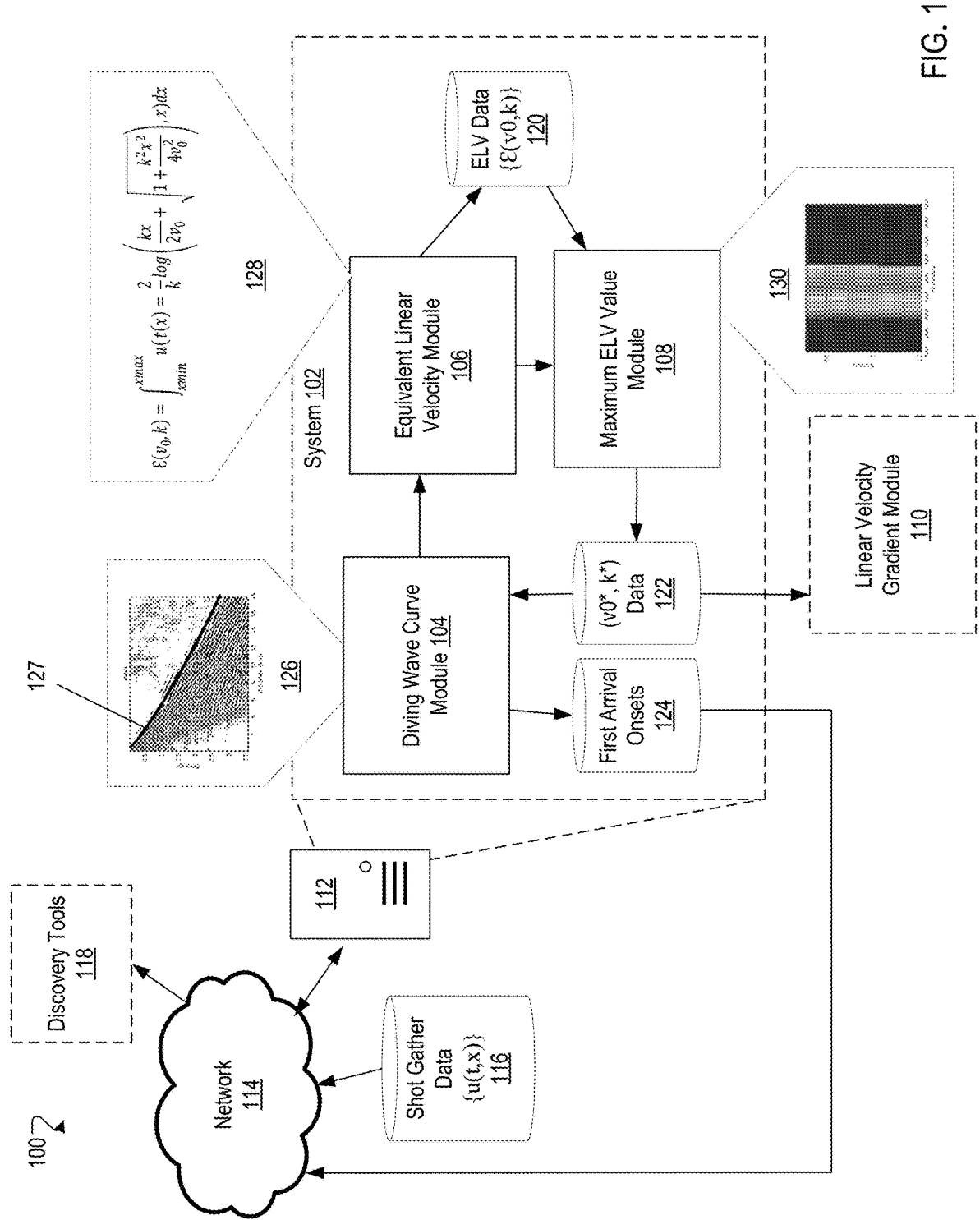
FIG. 1 is an example of an operating environment for the first arrival onset system.

The technology of this patent application is intended to predict the first-arrival onsets for a shot gather using the diving-wave moveout equation and assuming a constant gradient velocity medium.

More particularly, a seismic shot record u(t, x) is gathered in the time-offset domain, where the seismic traces in the shot gather are assembled as a function of offset x, for example, the distance between the source and receiver locations, over time t. The shot gather includes a refracted energy u(t, x), where t is the time interval between the shot at the source and the detection at the receiver and x is the offset. A range of offsets ($x_{min}$, $x_{max}$) is defined, for example, 0-18 kilometers (km), where the range can be divided into at least two sub-ranges of offsets, for example, a first sub-range including 0-10 km and a second sub-range including 10-18 km.

The medium through which the shot gather is collected is assumed to be a constant velocity gradient medium such that a constant gradient velocity model is assumed to be:

$$v(z) = v_0 + kz, \quad (1)$$

where z is the depth into the medium, k is a gradient variable (for example, ranging in value between 0-4), and $v_0$ is the velocity of the sound wave in the medium.

A diving wave moveout equation (2) curve is generated for a particular parameter pair value ($v_0$, k) of a range of possible parameter pair values ($v_0$, k):

$$t(x) = \frac{2}{k} \log\left(\frac{kx}{2v_0} + \sqrt{1 + \frac{k^2 x^2}{4v_0^2}}\right). \quad (2)$$

The shot gather record stacked data is integrated over the selected sub-range of offsets to calculate an equivalent linear velocity spectrum $\varepsilon(v_0, k)$ for the particular parameter pair ($v_0$, k):

$$\varepsilon(v_0, k) = \int_{x_{min}}^{x_{max}} u\left(t(x) = \frac{2}{k}\log\left(\frac{kx}{2v_0} + \sqrt{1 + \frac{k^2 x^2}{4v_0^2}}\right), x\right) dx. \quad (3)$$

In other words, the integral of equation (3) is a summation of the stacked shot record data u(t, x) that overlaps the curve defined by the diving wave equation (2) for the particular parameter pair value ($v_0$, k), such that the u(t, x) values for each (t, x) pair that is identified along the curve defined by (2) is aggregated to generate $\varepsilon(v_0, k)$.

Each parameter pair ($v_0$, k) of a range of $v_0$ and a range of k values is input into the process described earlier to yield an equivalent linear velocity spectrum $\varepsilon(v_0, k)$ of the shot gather through the medium. A greatest magnitude of the equivalent linear velocity spectrum $\varepsilon(v_0, k)$ is found, the details of which are found in reference to FIG. 4. The greatest magnitude of the equivalent linear velocity spectrum corresponds to a first arrival parameter pair ($v_{0*}$, k*) representing a best-fit diving-wave travel-time trajectory for sound waves to travel in the medium, assuming a linear velocity medium. In physical terms, the diving wave curve corresponding to the maximum amplitude of the stacked shot gather from the shot gather data, indicating that it is representative of the first-onset arrivals of the shot-gather in a linear velocity medium.

A number of iterations can be determined, for example, by cost considerations, accuracy threshold requirements, speed of processing, or other practical considerations. At least two iterations including different sub-ranges ($x_{min}$, $x_{max}$) of the full offset range can be performed to cover the entire range of the offsets for the shot gather. In general, two iterations can yield an accuracy of a first-arrival calculation to be useful in other applications.

The corresponding first-arrival parameter pair ($v_{0*}$, k*) can then be used to pick first arrival onsets for a range of offset values using the diving wave equation (2), where first-arrival onsets can be picked from the shot gather u(t, x) and a linear regression can be fitted to the first arrival onsets. Further details of this process is discussed with reference to FIG. 6.

Additionally, first-arrival parameter pair ($v_{0*}$, k*) that results can then be used to generate a linear velocity plot using equation (2) for ($v_{0*}$, k*) that can be provided as input to other applications for assisting in discovery, for example, in subsurface imaging and geological characterization applications.

Example Operating Environment

FIG. 1 is a block diagram of an example environment 100 in which an equivalent linear velocity is used to compute first-arrival onsets associated with the refracted energy of a shot record. System 102 can include a diving wave curve module 104, an equivalent linear velocity (ELV) module 106, and a maximum ELV module 108. The system 102 can additionally include a linear velocity gradient module 110. Though depicted in FIG. 1 as diving wave curve module 104, ELV module 106, maximum ELV module 108, and linear velocity gradient module 110, more or fewer modules can be implemented to perform the processes described with respect to diving wave curve module 104, ELV module 106, maximum ELV module 108, and linear velocity gradient module 110.

System 102 can be hosted on one or more servers 112. Server(s) 112 include one or more hardware processors and memory. The one or more hardware processors can each include multiple processor cores. The memory can include both volatile and non-volatile memory, such as Random Access Memory (RAM) and Flash RAM. The server(s) 112 can include various types of computer storage media and devices to store instructions of program(s) that run on the processor(s).

Server(s) 112 can be in data communication with a network 114, where network 114 can be, for example, a local area network (LAN), a wide area network (WAN), the Internet, or a combination thereof. In some implementations, server(s) 112 can access one or more databases for storing data through the network 114, for example, shot gather data 116.

Network 114 can be in data communication with one or more discovery tool(s) 118. Discovery tool(s) 118 can be, for example, subsurface imaging applications and geological characterization applications.

System 102 can additionally include one or more database(s), that can be stored locally on the one or more server(s) 112, accessed through the network 116, or a combination thereof. Databases can include respective database(s) storing equivalent linear velocity values 120, first arrival pair parameter values 122, and first arrival onset values 124.

Figure 2:
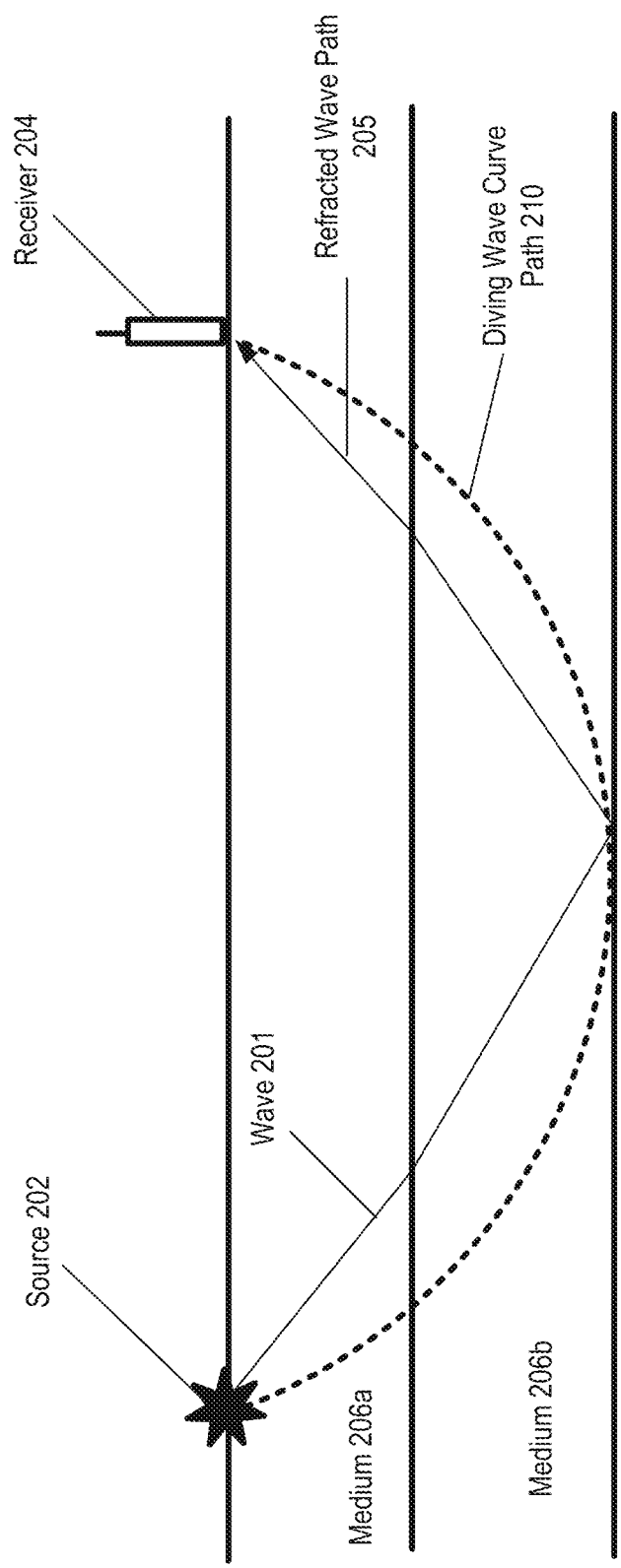
FIG. 2 illustrates an example source and receiver for collecting a seismic shot gather in a medium.

In one embodiment, system 102 receives shot gather data 116. Shot gather can be collected by various methods, for example, using common midpoint gather, common offset gather, common azimuth gather, or another similar method. An example of a shot gather collection is depicted in FIG. 2.

The diving wave curve (DWC) module 104 can receive the shot gather data u(t,x) 116 and generate diving wave curves for a range of $v_0$ and a range of k values using equation (2) for each parameter pair ($v_0$, k). An example range of $v_0$ values can be, for example, 800-3500 meters/second. An example range of k values can be, for example, 0.05-2.5 1/seconds.

In some implementations, the DWC module 104 generates a plot 126 of the shot gather data 116, as described in more detail with reference to FIG. 3. The plot 126 can include a particular diving wave curve 127 generated using a particular parameter pair ($v_0$, k). In some implementations, the DWC module 126 can generate a curve 127 of the diving wave equation (2) for each parameter pair ($v_0$, k) and plot the curve 127 on the shot gather plot 126 (see FIG. 3).

The DWC module 104 provides as output a particular diving wave curve 127 for particular parameter pair ($v_0$, k) for the shot gather data 116 to the equivalent linear velocity module 106. In some implementations, the particular diving wave curve 127 is plotted on the plot 126 of the shot gather data 116. The DWC module 104 can provide, as output, a set of diving wave curves 127, each diving wave curve 127 corresponding to a respective parameter pair value ($v_0$, k) over respective ranges of $v_0$ and k, where $v_0$ and k are independently selected from a range of $v_0$ values and a range of k values.

The equivalent linear velocity (ELV) module 106 receives as input one or more diving wave curves 127 for a u(t, x) shot gather 116 and a particular range of offsets ($x_{min}$, $x_{max}$). Using equation (3), the ELV module 106 solves an integral 128 over ($x_{min}$, $x_{max}$) for the particular diving wave curve 127 and the u(t, x) shot gather 116 to generate as output an equivalent linear velocity (ELV) value 120 for the particular diving wave curve 127 over the particular range of offset values ($x_{min}$, $x_{max}$). The ELV module 106 can calculate an ELV value 120 for each particular parameter pair and over the particular offset sub-range until a set of ELV values 120 are generated for the shot gather data 116.

The maximum ELV value module 108 receives as input the ELV values 120 and provides as output a maximum ELV value including a corresponding first-arrival parameter pair ($v_{0*}$, k*) 122 for the maximum ELV value. The maximum ELV value module 108 can determine a greatest magnitude equivalent linear velocity value from two-dimensional matrix of equivalent linear velocity values comprising the equivalent linear velocity spectrum $\varepsilon(v_0, k)$, and provide as output a corresponding first-arrival parameter pair ($v_{0*}$, k*) 122. In some implementations, determining the maximum ELV value can include plotting ELV values 120 on a $v_0$ versus k plot 130, as is described in more detail with reference to FIG. 4.

In some implementations, the DWC module 104 can generate a diving wave curve 127 for the first-arrival parameter pair ($v_{0*}$, k*) 122 corresponding to the maximum ELV value determined by the maximum ELV value module 108:

$$t(x) = \frac{2}{k^*}\log\left(\frac{k^* x}{2v_0^*} + \sqrt{1 + \frac{k^{*2} x^2}{4v_0^{*2}}}\right) \tag{4}$$

Equation (4) can be utilized by the DWC module 104 to generate a set of first arrival onsets 124. For example, the first arrival onsets 124 can be picked for a range of offsets ($x_{min}$, $x_{max}$) where a t(x) curve is generated for the values ($v_{0*}$, k*) 122. Values of the shot gather u(t, x) that overlap with the curve generated using equation (4) are the first arrival onsets 124. The first arrival onsets 124 can be provided as input to discovery tool(s) 118 over the network 114, for example, applications that perform subsurface imaging and geological characterization.

In some implementations, a linear velocity gradient module 110 can receive as input the first-arrival parameter pair ($v_{0*}$, k*) 122 and generate a linear velocity gradient plot, as described in further detail with reference to FIG. 5.

FIG. 2 illustrates an example source 202 and receiver 204 for collecting a seismic shot gather in a medium. A medium can include one or more sub-mediums, each having a different speed of sound through the medium, for example, due to compositional difference, such that a wave 201 emitted from source 202 can refract at different angles through sub-mediums 206a and 206b and travel along a refracted wave path 205 from source 202 to receiver 204. For example, sub-mediums 206a and 206b can represent regions that respectively have different compositions including water, oil, air, or stone, where sound travels at differing speeds depending on the particular composition of each sub-medium.

In some implementations, a diving wave equation (2) can be used to model a diving wave curved path 210 of travel for a wave emitted from source 202 and received at receiver 204, assuming that the velocity of sound in the medium including the sub-mediums 206a and 206b is linear as described by equation (1). A shot gather can be collected utilizing multiple sources 202 and multiple receivers 204. Data from the shot gather can be collected as a function of offset x between source 202 and receiver 204 and time t to receive the signal from the source 202 at a receiver 204, and provided, for example, as shot gather data 116 to system 102.

Figure 3:
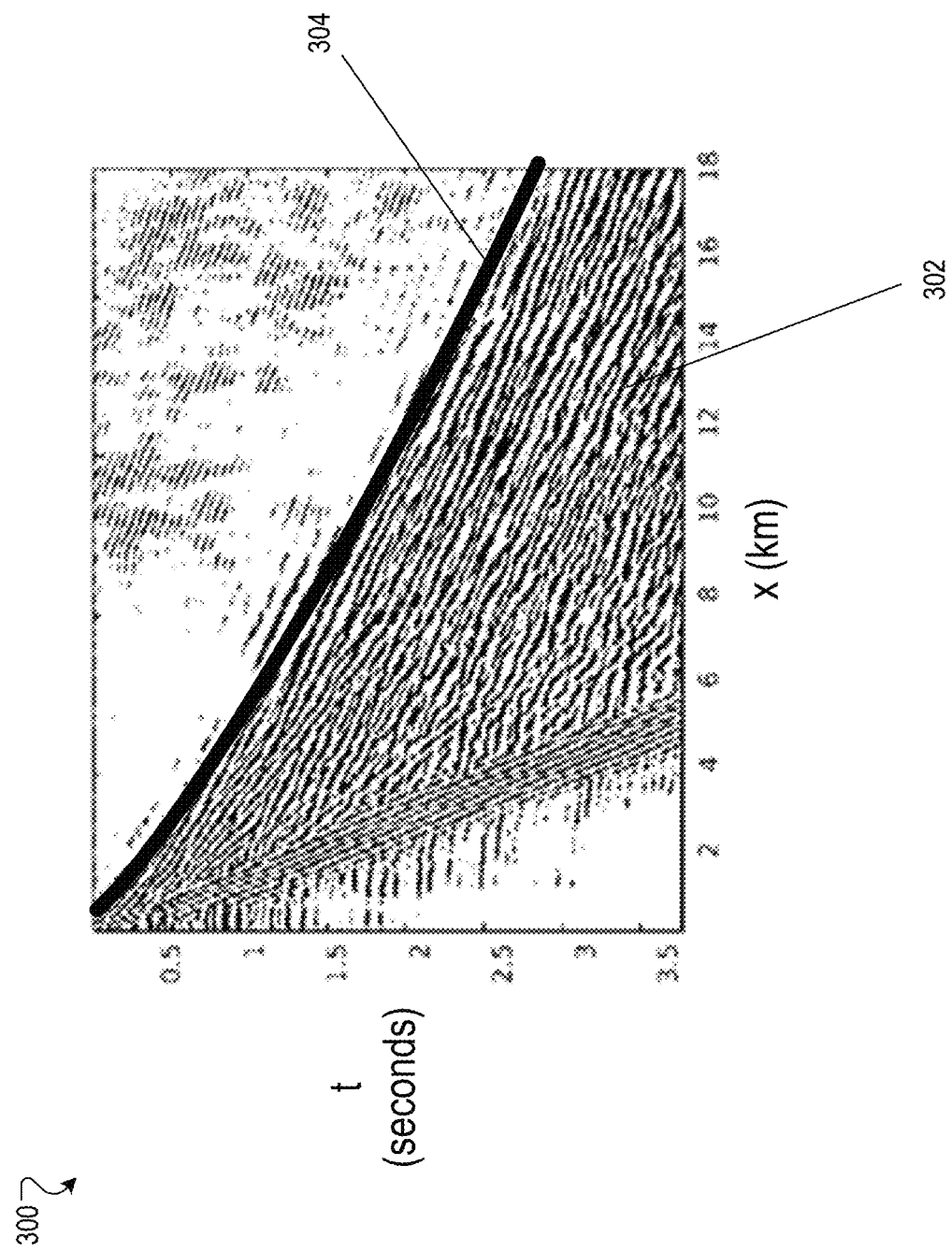
FIG. 3 is an example plot of a shot gather u(t, x) and a diving wave equation curve.

FIG. 3 is an example plot 300 of a shot gather u(t, x) 302 and a diving wave equation curve 304. As described with reference to FIG. 2, the shot gather u(t, x) is collected as a function of offset x between source 202 and receiver 204 and an interval of time between the source 202 emitting a signal and the signal being detected at the receiver 204. The diving wave equation (2) is utilized to generate curve 304 (for example, curve 127) for a particular parameter pair ($v_0$, k) and plotted on the plot 300 with shot gather 302, for example, by the diving wave curve module 104 of FIG. 1.

A set of multiple curves 304 is generated, where each curve 304 is associated with a respective pair parameter ($v_0$, k). Each curve 304 is generated using a different pair parameter ($v_0$, k) and is different from each other curve of the multiple curves 304. For each curve 304 generated for a particular parameter pair ($v_0$, k), an equivalent linear velocity value $\varepsilon(v_0, k)$ is calculated using equation (3), where the diving wave equation is integrated over a sub-range of offsets ($x_{min}$, $x_{max}$) for values of u(t, x) of the shot gather record. The equivalent linear velocity (ELV) values (for example, ELV values 120) for the multiple curves 304 can be plotted together, where each point of the equivalent linear velocity plot includes an ELV value 120 for a particular curve that is a solution to equation (3).

Figure 4:
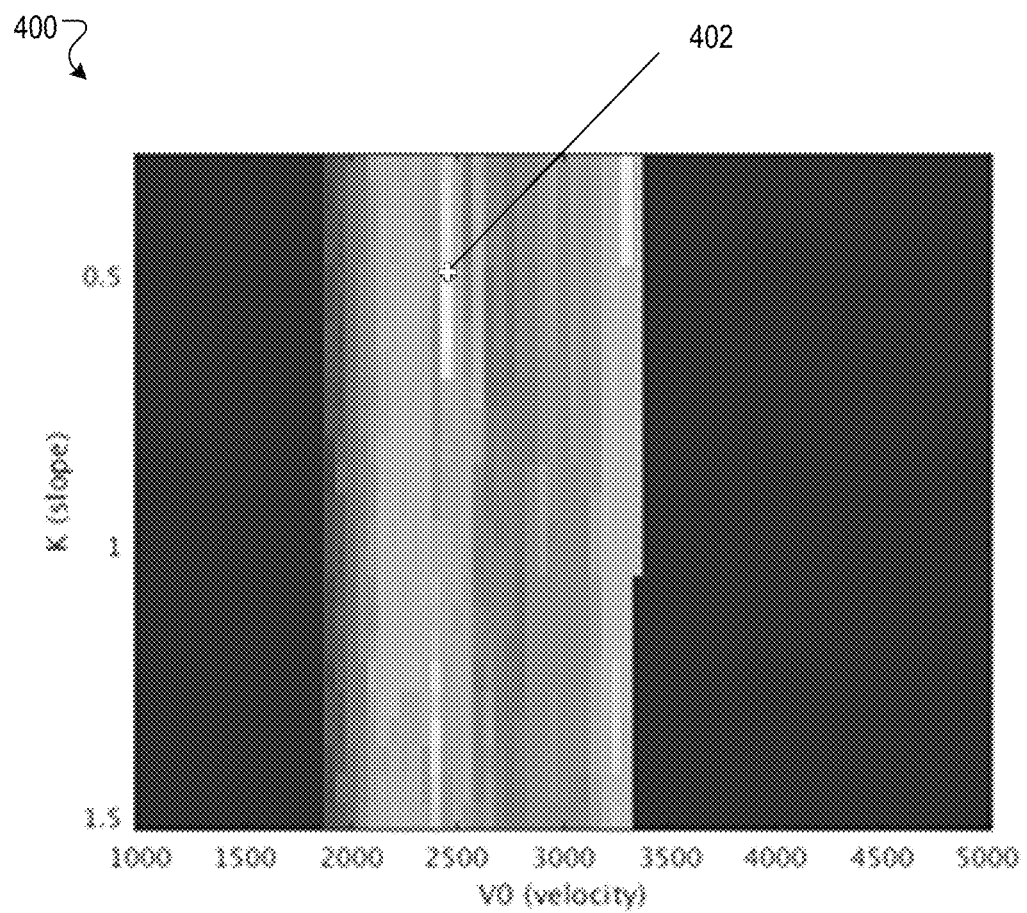
FIG. 4 is an example plot of equivalent linear velocities for a shot gather through a medium.

FIG. 4 is an example equivalent linear velocity spectrum 400 of equivalent linear velocities for a shot gather through a medium. The equivalent linear velocity (ELV) spectrum 400 is generated using ELV values 120, where each point on the ELV spectrum 400 is an ELV value 120 resulting from solving equation (3), as described with reference to FIGS. 1 and 3. Each point on the ELV spectrum 400 is an aggregation of all the shot gather data 116 of the shot gather u(t, x) that coincide with a particular curve 127 for a particular set of parameter pair values ($v_0$, k).

A maximum equivalent linear velocity (ELV) value 402 of the ELV spectrum 400 is found, corresponding to a particular first-arrival parameter pair ($v_{0*}$, k*). A maximum ELV value 402 of the ELV spectrum 400 can be determined using gradient descent or another similar algorithm for determining a maximum value of a gradient plot.

First-arrival parameter pair ($v_{0*}$, k*) can be utilized to generate a set of first arrival onsets, for example, using diving wave equation (4). The diving wave equation (4) for the first-arrival parameter pair ($v_{0*}$, k*) found using ELV plot 400 is applied to the shot gather, for example, as depicted in FIG. 3, and the point(s) of the shot gather u(t, x) that coincide (for example, overlap with) the curve generated by equation (4) can be picked as the first arrival onsets (for example, first arrival onsets 124).

In some implementations, the first arrival onsets generated using the process described in this document can be provided to other discovery software tools. For example, first arrival onsets can be utilized in subsurface imaging and geological characterization techniques.

In some implementations, the first-arrival parameter pair ($v_{0*}$, k*) can be utilized to generate a shallow equivalent linear velocity model. FIG. 5 is an example plot 500 of a shallow equivalent linear (ELV) model in a medium, where the depth z corresponds to the depth into the medium in the region of interest and x corresponds to a distance from source to receiver, for example, source 202 to receiver 204. The shallow ELV model can be utilized in an inversion scheme to derive an accurate near-surface velocity model for the region of interest, which can be utilized in subsurface imaging and geological characterization of the region of interest.

Figure 6:
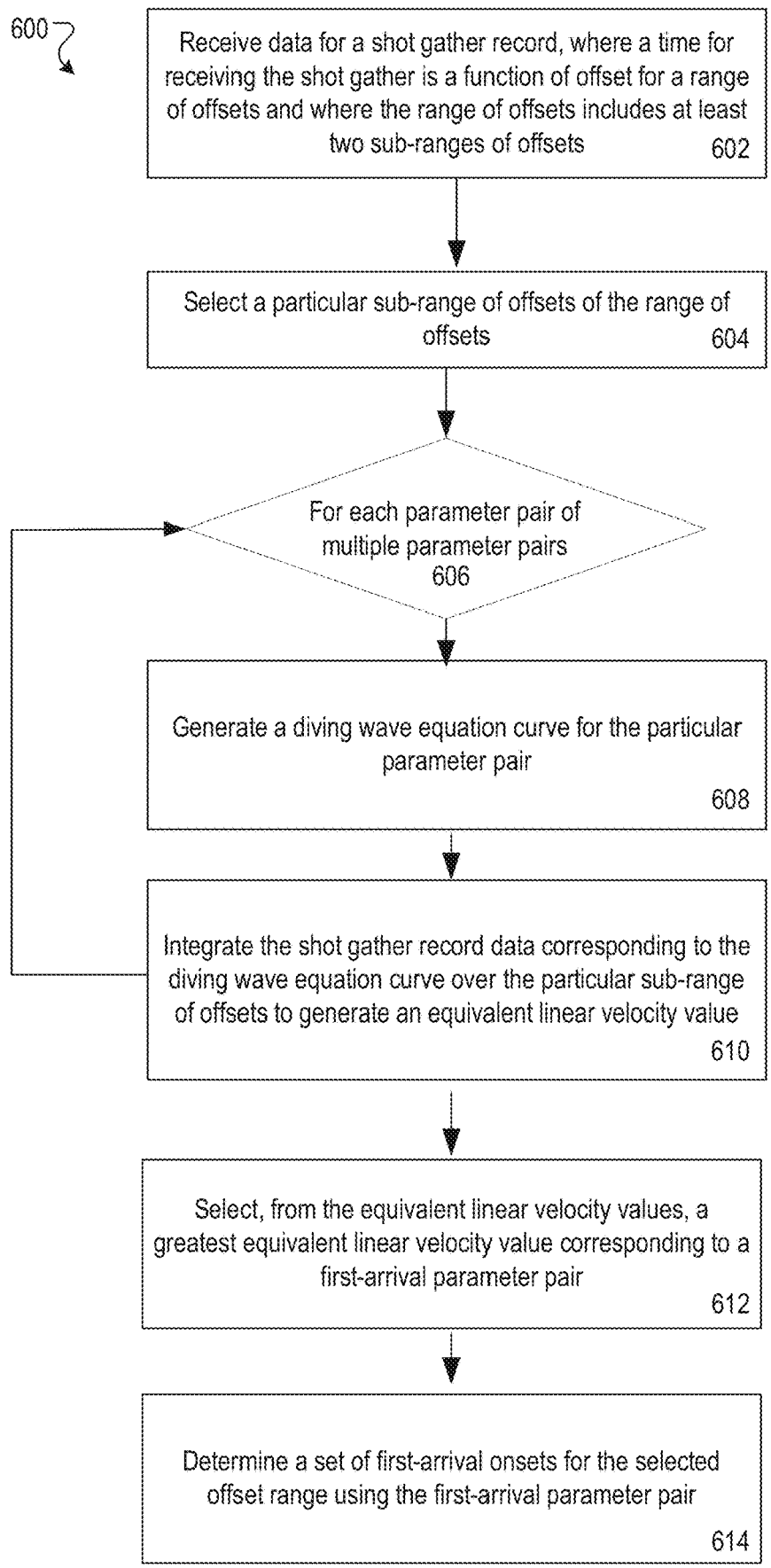
FIG. 6 is a flow diagram of an example process for using equivalent linear velocities to pick first arrival onsets of a seismic refraction.

FIG. 6 is a flow diagram of an example process 600 for using equivalent linear velocity to pick the first arrival onsets of a seismic refraction. Data for the shot gather record is received, where a time t for receiving the shot gather is a function of offset for a range of offsets, and where the range of offsets includes at least two sub-ranges of offsets (602). A shot gather record 116 can be collected using various techniques, including but not limited to, common midpoint gather, common offset gather, common source or receiver gather, or another similar shot gather method. The range of offsets for the shot gather can be, for example, 18 km, 25 km, less than 50 km, or another similar industry-standard range. Sub-ranges of the offsets can be two or more sub-ranges, for example, where a first sub-range is 0-10 km and a second sub-range is 10-18 km of the total offset range.

A particular sub-range of offsets of the range of offsets is selected (604). A first iteration of the process 600 is performed for a first sub-range of the multiple sub-ranges of offsets. In one example, a first sub-range ($x_{min}$, $x_{max}$) is (0 km, 10 km).

For each parameter pair ($v_0$, k) of a plurality of parameter pairs (606), where the particular parameter pair is a velocity of sound $v_0$ in the medium and a gradient variable k, generate a diving wave equation curve for the particular parameter pair (608). A range of possible velocities $v_0$ and gradient variable values k are possible for the shot gather. In some implementations, $v_0$ and k are independent of each other such that $v_0$ and k can be selected separately from each other for a particular parameter pair ($v_0$, k).

The shot gather record data corresponding to the diving wave equation curve, for example, equation (3), is integrated over the particular sub-range of offsets, for example, 0-10 km, to generate an equivalent linear velocity value, for example, ELV value 120, for the particular parameter pair ($v_0$, k) and the shot gather record data, for example, shot gather data 116 (610). In some implementations, integrating the shot gather record data 116 corresponding to the diving wave equation curve (3) includes an aggregation of the stacked shot gather record data u(t, x) along the diving wave equation curve, for example, curve 304, for the particular parameter pair value ($v_0$, k). Process steps 608, 610 can be repeated for each parameter pair of the multiple parameter pairs to find respective ELV values for each parameter pair and to generate an equivalent linear velocity spectrum 400.

A greatest equivalent linear velocity value of the equivalent linear velocity magnitude values is selected from the equivalent linear velocity values for the multiple parameter pairs where the greatest magnitude value corresponds to a first-arrival parameter pair (612). In some implementations, selecting, from the equivalent linear velocity values, a greatest magnitude value includes generating an equivalent linear velocity spectrum from the equivalent linear velocity values corresponding to the plurality of parameter pairs, and selecting a greatest magnitude value of the equivalent linear velocity values from the equivalent linear velocity spectrum 400.

Using the first-arrival parameter pair, a set of first-arrival onsets for the selected offset range is determined (614). In some implementations, determining a set of first-arrival onsets for the selected offset range using the first-arrival parameter pair includes generating a diving wave equation curve 304 using the first-arrival parameter pair ($v_{0*}$, k*).

In some implementations, the equivalent linear velocity spectrum and set of first-arrival onsets are generated in a first iteration for a first sub-range of offsets, and then multiple additional iterations are repeated. The additional iterations generate the equivalent linear velocity and the set of first-arrival onsets for multiple sub-ranges of offsets until the selected sub-ranges of offsets cover a full range of offsets for the shot gather record.

Figure 5:
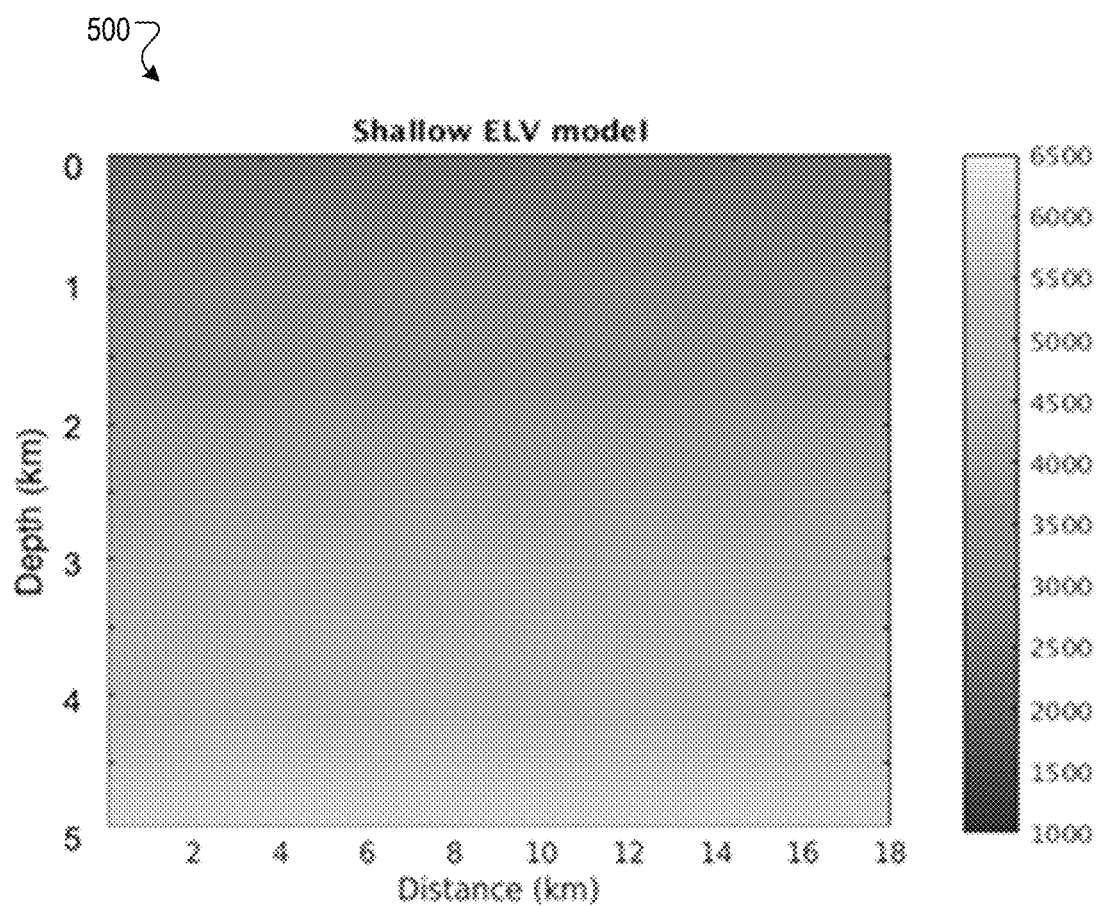
FIG. 5 is an example plot of a linear gradient velocity in a medium.

In some implementations, the first-arrival parameter pair ($v_{0*}$, $k^*$) and the sub-range of offsets is used to generate a constant gradient velocity plot, for example, plot 500 depicted in FIG. 5.

Figure 7:
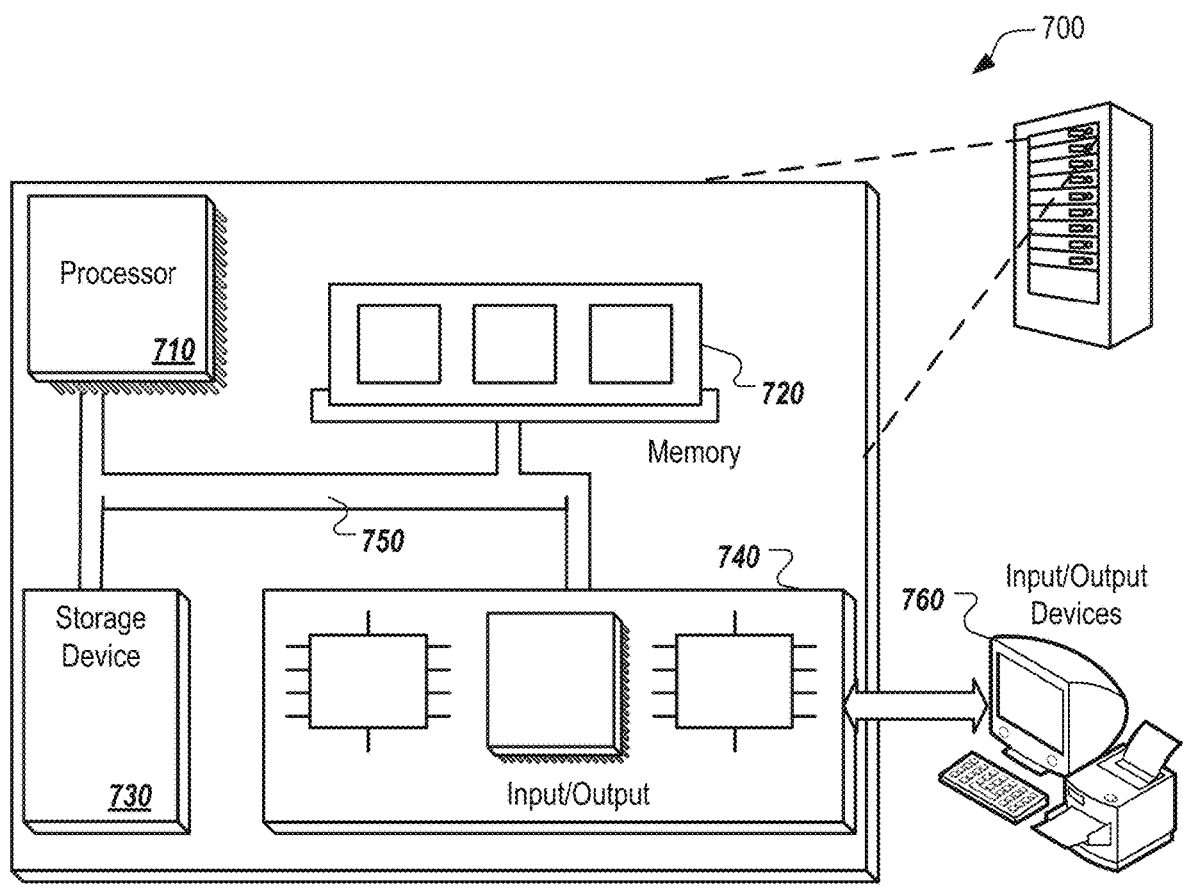
FIG. 7 is a block diagram illustrating an example computer system used to provide computational functionalities associated with described algorithms, methods, functions, processes, flows, and procedures as described in the instant disclosure, according to some implementations.

FIG. 7 is block diagram of an example computer system 700 that can be used to perform operations described earlier. The system 700 includes a processor 710, a memory 720, a storage device 730, and an input/output device 740. Each of the components 710, 720, 730, and 740 can be interconnected, for example, using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 can include, for example, a hard disk device, an optical disk device, or a storage device that is shared over a network by multiple computing devices, for example, a cloud storage device, or some other large capacity storage device.

The input/output device 740 provides input/output operations for the system 700. In one implementation, the input/output device 740 can include one or more network interface devices, for example, an Ethernet card, a serial communication device, for example, and RS-232 port, a wireless interface device, or a combination thereof, for example, a 802.11 card. In another implementation, the input/output device can include driver devices configured to receive input data and send output data to other input/output devices, for example, keyboard, printer and display devices 760. Other implementations, however, can also be used, such as mobile computing devices, mobile communication devices, or other similar devices having data processing capabilities.

Although an example processing system has been described in FIG. 7, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them, that in operation cause the system to perform the operations or actions. For one or more computer programs to be configured to perform particular operations or actions means that the one or more programs include instructions that cause the apparatus to perform the operations or actions when executed by a data processing apparatus.

Embodiments of the subject matter and the functional operations described in this specification can be implemented in digital electronic circuitry, in tangibly-embodied computer software or firmware, or in computer hardware, including the structures disclosed in this specification and their structural equivalents, or in combinations of one or more of them. Embodiments of the subject matter described in this specification can be implemented as one or more computer programs, that is, one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, for example, a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be or include special purpose logic circuitry. For example, the apparatus can be an FPGA (field programmable gate array) or an ASIC (application-specific integrated circuit). The apparatus can optionally include, in addition to hardware, code that creates an execution environment for computer programs, for example, code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers, and in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, for example, an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory, a random access memory, or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device, for example, a universal serial bus (USB) flash drive, to name just a few.

Computer-readable media suitable for storing computer program instructions and data include all forms of nonvolatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks.

To provide for interaction with a user, embodiments of the subject matter described in this specification can be implemented on a computer having a display device, for example, a CRT (cathode ray tube) or LCD (liquid crystal display) monitor, for displaying information to the user, and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, for example, a smartphone that is running a messaging application, and receiving responsive messages from the user in return.

Data processing apparatus for implementing machine learning models can also include, for example, special-purpose hardware accelerator units for processing common and compute-intensive parts of machine learning training or production, that is, inference or workloads.

Machine learning models can be implemented and deployed using a machine learning framework, for example, a TensorFlow™ framework, a Microsoft Cognitive Toolkit™ framework, an Apache Singa™ framework, or an Apache MXNet™ framework.

Embodiments of the subject matter described in this specification can be implemented in a computing system that includes a back-end component, for example, as a data server. The computing system can include a middleware component, for example, an application server. The computing system can include a front-end component, for example, a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, for example, a communication network. Examples of communication networks include a local area network (LAN) and a wide area network (WAN), for example, the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, for example, an HTML page, to a user device. The server can transmit the data, for example, for purposes of displaying data to and receiving user input from a user interacting with the device, which acts as a client. Data generated at the user device, for example, a result of the user interaction, can be received at the server from the device.

While this specification contains many specific implementation details, these should not be construed as limitations on the scope of what may be claimed, but rather as descriptions of features that may be specific to particular embodiments of the subject matter described in this document. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described in this document as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described in this document should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for determining first-arrival onsets for a shot gather for a medium, comprising:
   receiving, by at least one hardware processor, data for the shot gather record, wherein a time for receiving the shot gather is a function of offset for a range of offsets, wherein the range of offsets includes at least two sub-ranges of offsets;
   selecting a particular sub-range of offsets of the range of offsets;
   for each parameter pair of a plurality of parameter pairs, wherein a particular parameter pair is a velocity of sound in the medium and a gradient variable:
      generating a diving wave equation curve for the particular parameter pair; and
      integrating, over the particular sub-range of offsets, the shot gather record data corresponding to the diving wave equation curve to generate an equivalent linear velocity value for the particular parameter pair and the shot gather record data;
   selecting, from the equivalent linear velocity values for the plurality of parameter pairs, a greatest equivalent linear velocity value of the equivalent linear velocity values, the greatest equivalent linear velocity value corresponding to a first-arrival parameter pair;
   determining a set of first-arrival onsets for the selected sub-range of offsets from points of the shot gather record data that coincide with a diving wave equation of the first-arrival parameter pair; and
   imaging, in near-surface tomography, a subsurface including the medium in a region of interest by seismic data processing of the set of first-arrival onsets.

2. The method of claim 1, where integrating the shot gather record data corresponding to the diving wave equation curve comprises a summation of a stacked shot gather record data $u(t, x)$ along the diving wave equation curve for the particular parameter pair value $(v_0, k)$.

3. The method of claim 1, wherein selecting, from the equivalent linear velocity values, a greatest equivalent linear velocity value comprises:
   generating, from the equivalent linear velocity values corresponding to the plurality of parameter pairs, an equivalent linear velocity spectrum; and
   selecting, from the equivalent linear velocity spectrum, a greatest magnitude value of the equivalent linear velocity values.

4. The method of claim 1, wherein determining, using the first-arrival parameter pair, a set of first-arrival onsets for the selected sub-range of offsets comprises generating a diving wave equation curve using the first-arrival parameter pair.

5. The method of claim 1, further comprising generating, using the particular parameter pair and for the sub-range of offsets, a constant gradient velocity plot.

6. The method of claim 1, wherein an equivalent linear velocity spectrum and set of first-arrival onsets are generated in a first iteration, the method further comprising:
   repeating the generations of the equivalent linear velocity and the set of first-arrival onsets in a plurality of iterations until the selected sub-ranges of offsets cover the range of offsets for the shot gather record.

7. A system, comprising:
   one or more processors; and
   a computer-readable storage device coupled to the one or more processors and having instructions stored thereon which, when executed by the one or more processors, cause the one or more processors to perform operations for determining first-arrival onsets for a shot gather for a medium, the operations comprising:
      receiving, by at least one hardware processor, data for the shot gather record, wherein a time for receiving the shot gather is a function of offset for a range of offsets, wherein the range of offsets includes at least two sub-ranges of offsets;
      selecting a particular sub-range of offsets of the range of offsets;
      for each parameter pair of a plurality of parameter pairs, wherein a particular parameter pair is a velocity of sound in the medium and a gradient variable:
         generating a diving wave equation curve for the particular parameter pair; and
         integrating, over the particular sub-range of offsets, the shot gather record data corresponding to the diving wave equation curve to generate an equivalent linear velocity value for the particular parameter pair and the shot gather record data;
      selecting, from the equivalent linear velocity values for the plurality of parameter pairs, a greatest equivalent linear velocity value of the equivalent linear velocity values, the greatest equivalent linear velocity value corresponding to a first-arrival parameter pair;
      determining a set of first-arrival onsets for the selected sub-range of offsets from points of the shot gather record data that coincide with a diving wave equation of the first-arrival parameter pair; and
      imaging, in near-surface tomography, a subsurface including the medium in a region of interest by seismic data processing of the set of first-arrival onsets.

8. The system of claim 7, wherein integrating the shot gather record data corresponding to the diving wave equation curve comprises a summation of a stacked shot gather record data $u(t, x)$ along the diving wave equation curve for the particular parameter pair value $(v_0, k)$.

9. The system of claim 7, wherein selecting, from the equivalent linear velocity values, a greatest equivalent linear velocity value comprises:
   generating, from the equivalent linear velocity values corresponding to the plurality of parameter pairs, an equivalent linear velocity spectrum; and
   selecting, from the equivalent linear velocity spectrum, a greatest magnitude value of the equivalent linear velocity values.

10. The system of claim 7, wherein determining, using the first-arrival parameter pair, a set of first-arrival onsets for the selected sub-range of offsets comprises generating a diving wave equation curve using the first-arrival parameter pair.

11. The system of claim 7, further comprising generating, using the particular parameter pair and for the sub-range of offsets, a constant gradient velocity plot.

12. The system of claim 7, wherein an equivalent linear velocity spectrum and set of first-arrival onsets are generated in a first iteration, the operations further comprising:
   repeating the generations of the equivalent linear velocity and the set of first-arrival onsets in a plurality of iterations until the selected sub-ranges of offsets cover the range of offsets for the shot gather record.

13. One or more non-transitory computer-readable storage media coupled to one or more processors and having instructions stored thereon which, when executed by the one or more processors, cause the one or more processors to perform operations for determining first-arrival onsets for a shot gather for a medium, the operations comprising:

receiving, by at least one hardware processor, data for the shot gather record, wherein a time for receiving the shot gather is a function of offset for a range of offsets, wherein the range of offsets includes at least two sub-ranges of offsets;

selecting a particular sub-range of offsets of the range of offsets;

for each parameter pair of a plurality of parameter pairs, wherein a particular parameter pair is a velocity of sound in the medium and a gradient variable:
  generating a diving wave equation curve for the particular parameter pair; and
  integrating, over the particular sub-range of offsets, the shot gather record data corresponding to the diving wave equation curve to generate an equivalent linear velocity value for the particular parameter pair and the shot gather record data;

selecting, from the equivalent linear velocity values for the plurality of parameter pairs, a greatest equivalent linear velocity value of the equivalent linear velocity values, the greatest equivalent linear velocity value corresponding to a first-arrival parameter pair;

determining a set of first-arrival onsets for the selected sub-range of offsets from points of the shot gather record data that coincide with a driving wave equation of the first-arrival parameter pair; and imaging, in near-surface tomography, a subsurface including the medium in a region of interest by seismic data processing of the set of first-arrival onsets.

14. The computer-readable medium of claim 13, wherein integrating the shot gather record data corresponding to the diving wave equation curve comprises a summation of a stacked shot gather record data $u(t, x)$ along the diving wave equation curve for the particular parameter pair value $(v_0, k)$.

15. The computer-readable medium of claim 13, wherein selecting, from the equivalent linear velocity values, a greatest equivalent linear velocity value comprises:
  generating, from the equivalent linear velocity values corresponding to the plurality of parameter pairs, an equivalent linear velocity spectrum; and
  selecting, from the equivalent linear velocity spectrum, a greatest magnitude value of the equivalent linear velocity values.

16. The computer-readable medium of claim 13, wherein determining, using the first-arrival parameter pair, a set of first-arrival onsets for the selected offset range comprises generating a diving wave equation curve using the first-arrival parameter pair.

17. The computer-readable medium of claim 13, further comprising generating, using the particular parameter pair and for the sub-range of offsets, a constant gradient velocity plot.

18. The computer-readable medium of claim 13, wherein an equivalent linear velocity spectrum and set of first-arrival onsets are generated in a first iteration,
  the operations further comprising:
    repeating the generations of the equivalent linear velocity and the set of first-arrival onsets in a plurality of iterations until the selected sub-ranges of offsets cover the range of offsets for the shot gather record.

* * * * *